(12) United States Patent
Paduroiu et al.

(10) Patent No.: US 12,038,923 B1
(45) Date of Patent: Jul. 16, 2024

(54) SECURE QUERY PROCESSING

(71) Applicant: Amazon Technologies, Inc., Seattle, WA (US)

(72) Inventors: Andrei Paduroiu, Bellevue, WA (US); Yaron Burd, Bellevue, WA (US); Yan Yan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/988,724

(22) Filed: Nov. 16, 2022

(51) Int. Cl.
*G06F 16/2453* (2019.01)
*G06F 16/25* (2019.01)

(52) U.S. Cl.
CPC ...... *G06F 16/24542* (2019.01); *G06F 16/252* (2019.01)

(58) Field of Classification Search
CPC ............................ G06F 16/245; G06F 21/6227
USPC ......................................................... 707/718
See application file for complete search history.

(56) References Cited

U.S. PATENT DOCUMENTS

| | | | | |
|---|---|---|---|---|
| 7,984,043 B1* | 7/2011 | Waas | ................. | G06F 16/8358 |
| | | | | 707/718 |
| 2013/0191650 A1* | 7/2013 | Balakrishnan | ...... | G06F 21/6227 |
| | | | | 713/190 |
| 2018/0096166 A1 | 4/2018 | Rogers et al. | | |
| 2021/0374235 A1 | 12/2021 | Brossard et al. | | |
| 2023/0004669 A1* | 1/2023 | Langseth | .............. | G06F 21/602 |

OTHER PUBLICATIONS

Anonymous, "SQL Abstract Syntax Trees Vocabulary," retrieved on Feb. 17, 2023 from http://ns.inria.fr/ast/sql/index.html, Jan. 28, 2014, 26 pages.
International Search Report and Written Opinion dated Dec. 22, 2023, Patent Application No. PCT/US2023/075042, 15 pages.
Wikipedia, "User-defined Function," Retrieved on Apr. 9, 2015 from http://en.wikipedia.org/w/index.php?ti tle=User-defined function &oldid=401094103, 4 pages.

* cited by examiner

*Primary Examiner* — Hung T Vy
(74) *Attorney, Agent, or Firm* — Davis Wright Tremaine LLP (57) ABSTRACT

A distributed database keeps user-defined functions separate from a query engine by using a frontend. The frontend allows a user-defined function to interact with a proxy application processing interface (API) that is based on an API of the query engine. The frontend sends serialized data to the query engine in order to interact with the API of the query engine. The user-defined function is executed in security environments separate from the frontend and the query engine.

20 Claims, 7 Drawing Sheets

SECURE QUERY PROCESSING

BACKGROUND

Distributed databases are increasingly being used for a variety of applications, including those for which performance, flexibility, and security are all important factors. Distributed databases are also increasingly being employed in multiuser environments. In these and other environments, security is often difficult to achieve without sacrificing performance and flexibility.

BRIEF DESCRIPTION OF THE DRAWINGS

Various techniques will be described with reference to the drawings, in which.

DETAILED DESCRIPTION

In an example, a distributed database system processes a query in a secure manner by isolating a query engine from any user program that may be part of generating a query or be embedded within the query. For example, a user program is installed on a query engine frontend, separate from a query engine. In an embodiment, a query engine frontend is also referred to as a proxy query engine. The query engine front end also includes a query engine proxy API that is a copy of an original query engine API located on query engine, which allows a user program to interact with the query engine proxy API as if it were interacting with the original query engine API. In addition, a user-defined function executed as part of a query is wrapped to create an enveloped function and is ultimately executed in a security environment separate from the query engine. The query engine frontend, enveloped function, and separate security environment help to isolate a distributed query engine from any user code that may be part of generating a query or may be embedded within the query. The approach treats the query engine as a black box and requires no changes to the query engine.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
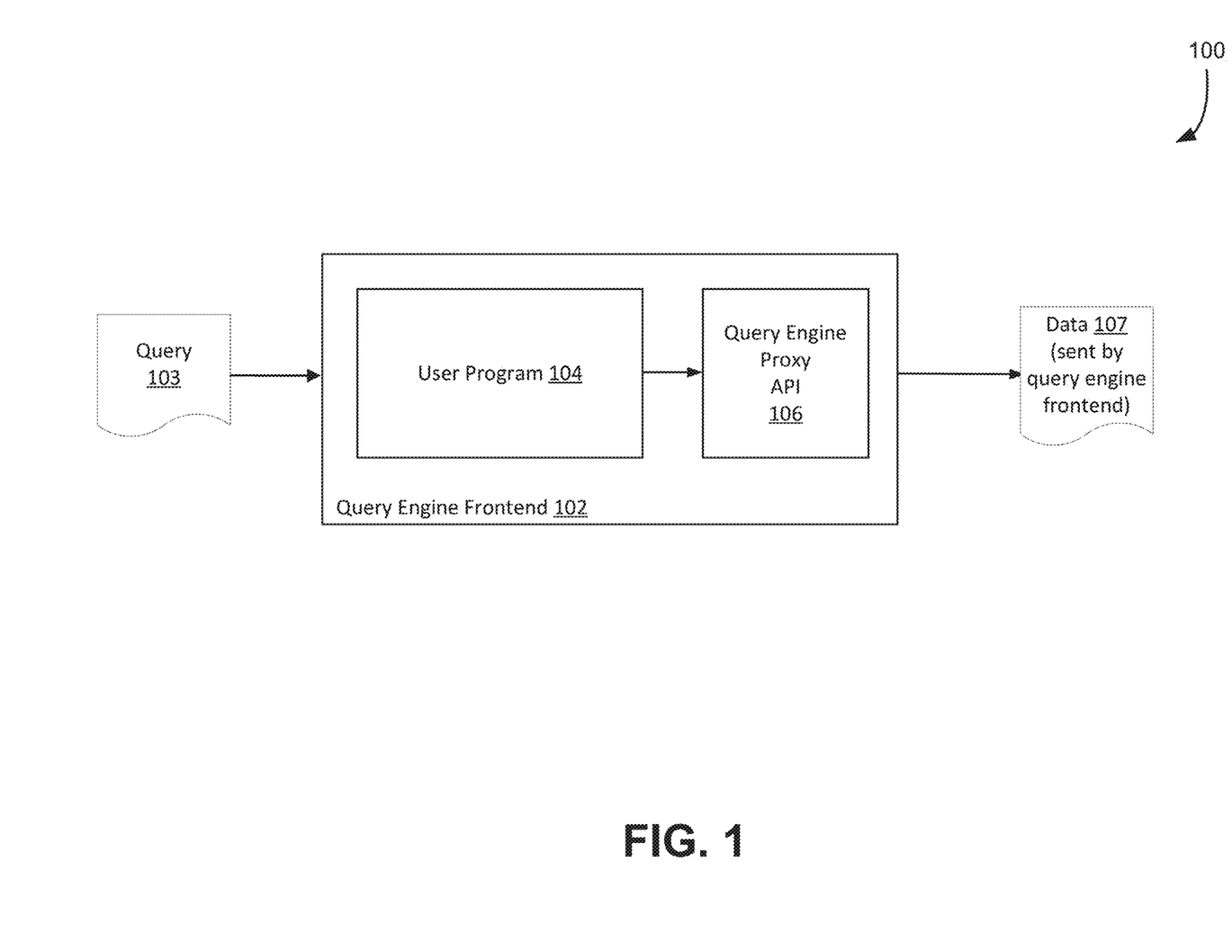
FIG. 1 illustrates an example of aspects of a distributed database system, in accordance with at least one embodiment.

FIG. 1 illustrates an example of aspects of a distributed database system 100, at least in part, in accordance with at least one embodiment. In this example embodiment, distributed database system 100 comprises a query engine frontend 102 that processes a query 103 using user program 104, query engine proxy application programming interface ("API") 106, and data 107.

A query, such as the depicted query 103, may include or correspond to instructions for inserting, updating, deleting, or reading data stored in the distributed database. In at least one embodiment, the query 103 is embodied as textual data, which may include but is not limited to structured query language ("SQL") statements or other programming languages. The query 103 may, in some embodiments, be expressed as natural language. The query 103 may also be embodied in code, for example as a sequence of API calls.

A distributed database, such as the depicted distributed database system 100, may include any of a variety of computing systems that store and retrieve data using a plurality of computing nodes to store partitioned data. A computing node can include any of a variety of computing devices that comprise at least one processor, a memory device for storing instructions to be processed by the at least one processor, and storage on which a portion of the partitioned data is stored. A query of a distributed database is processed by performing insert, update, delete, and/or read operations on two or more of the plurality of computing nodes that make up the distributed database.

A query engine frontend, such as the depicted query engine frontend 102, may include software and/or hardware to perform functions described and attributed to it herein. In an embodiment, a function may be user-defined function. A user-defined function may be referred to as a user function or as a function. A query engine frontend may be separated from other portions of the distributed database, such as a query engine, by being located in its own security domain. A user or user program may access a query engine frontend but is prevented from accessing a query engine. In at least an embodiment, a query engine frontend is referred to as a proxy query engine.

A user program, such as depicted user program 104 may include software and/or hardware to perform functions described and attributed to it herein. A user program can add, modify or retrieve data from database tables. A user program can initiate registration of user-defined functions with a database so that function can be recognized and used by the distributed database. A user program can initiate queries using SQL. A user program can program user-defined functions. A user-defined function is a function created by a user to return requested information from a distributed database. A user program may utilize APIs, such as APIs contained in query engine proxy API 106, to execute a query and/or user function. In at least an embodiment, a user function is a type of query.

A query engine proxy API, such as the depicted query engine proxy API 106, is at least a partial copy of a query engine API, and can be referred to as a delegate API. A query engine proxy API is part of a query engine frontend. Query engine APIs comprise sets of instructions that, when executed by a query engine, perform a task such as extracting information from a database in response to a query. A query engine proxy API allows a user program to interact with a copy of the query engine API without interacting with the query engine.

Figure 2:
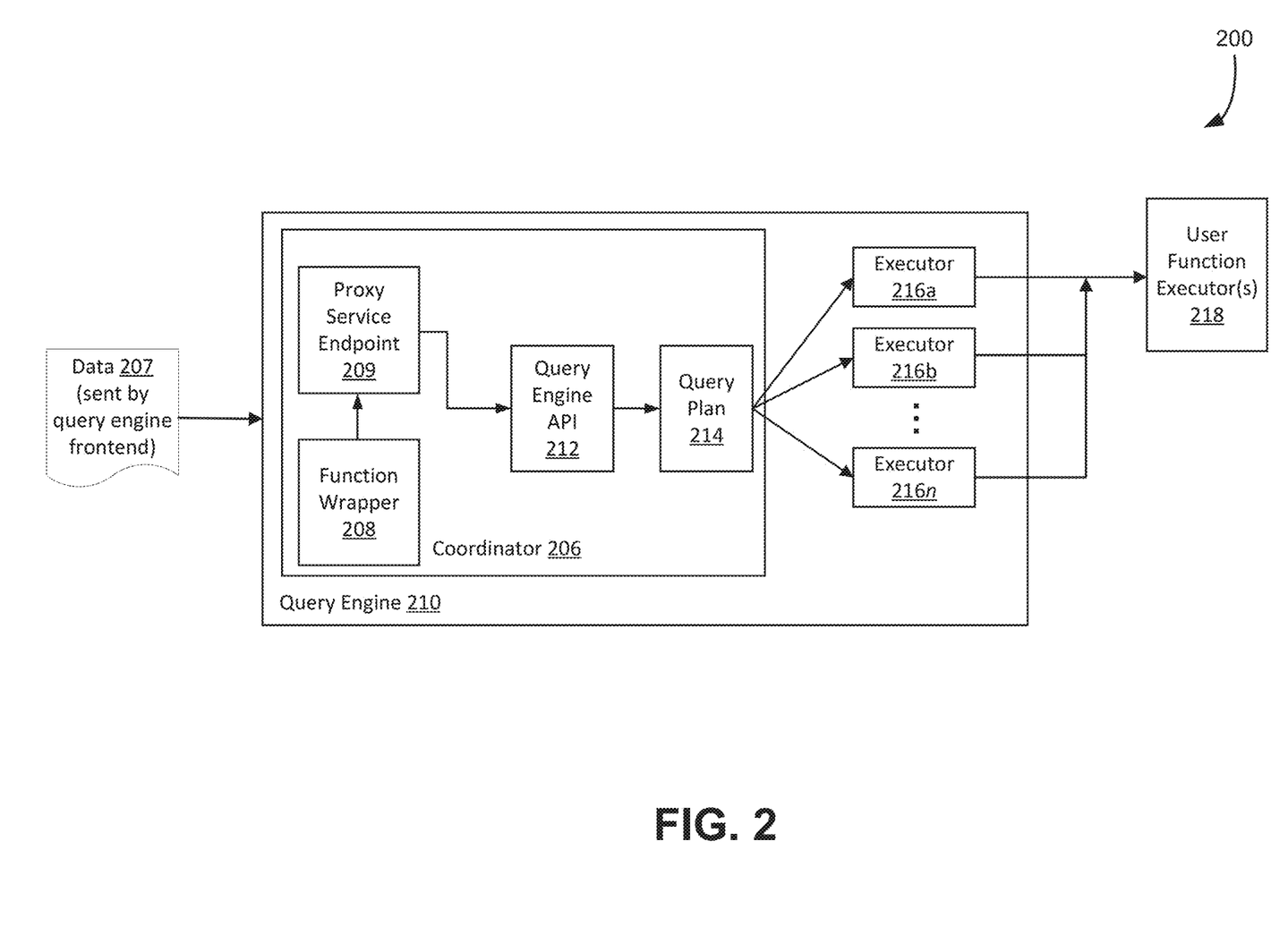
FIG. 2 illustrates an example of a distributed database system processing proxy API calls, in accordance with at least one embodiment.

Data, such as the depicted data 107, is serialized data representing a user function or a query as described further herein at least in conjunction with FIG. 2.

FIG. 2 illustrates an example of a distributed database system 200, at least in part, in accordance with at least one embodiment. In this example embodiment, distributed database system 200 comprises coordinator 206, data sent from frontend query engine 207, function wrapper 208, proxy service endpoint 209, query engine 210, query engine API 212, query plan 214, executors 216a-n and user function executor(s) 218. In at least an embodiment, distributed database system 200 is part of distributed database system 100.

Data sent by query engine frontend, such as the depicted data 207, may include data representing a user-defined function to be registered with distributed database system 200. In at least an embodiment, data 207 is data 107 as depicted in FIG. 1. Data may represent a signature and/or code of a user-defined function. A query engine frontend serializes data so it can be sent to query engine 210 over a data connection such as a network or temporary software connection.

The distributed database system 200 includes a query engine 210. In an embodiment, query engine 210 is query engine 110. A query engine, such as the depicted query engine 210, may include software and/or hardware to perform functions described and attributed to it herein. The coordinator 206 interacts with the query engine 210 to process a function, and to generate from a query plan based on that function.

A function wrapper, such as the depicted function wrapper 208, may include software and/or hardware to perform functions described and attributed to it herein. A function wrapper creates an enveloped function for a user-defined function that has been serialized and sent from a query engine frontend to a separate query engine. An enveloped function includes data related to the user-defined function, data such as data types for parameters, a data type for results, and proxy code. In an example embodiment, an enveloped function is represented by pseudocode such as:

$EF_1 := [F_1.ParamTypes, F_1.ResultType, Code:=Proxy(F_1.code)]$, where $EF_1$ is the enveloped function of a user-defined function; $F_1.ParamTypes$ are the data types for parameters of a user-defined function; $F_1.ResultType$ is a data type for results of the user-defined function; and $Code:=Proxy(F_1.code)$ is the proxy code of the user-defined function's code. Proxy code comprises an executable function that runs in a separate security domain as described further herein at least in conjunction with FIG. 3. In an embodiment, a function wrapper is embedded within a proxy service endpoint.

A proxy service endpoint, such as the depicted proxy service endpoint 209, processes data sent from a query engine frontend, such as function registration data or a proxy API call. A proxy service endpoint registers an enveloped function in the query engine, using an alias for the user-defined function. If the alias is referenced by a user program, the query engine invokes the enveloped function instead of the user-defined function.

In an embodiment, a query engine API, such as the depicted query engine API 212, comprises SQL procedures that can be invoked to perform various tasks such as, but not limited to, altering a sequence, creating a function, or executing a query. A query engine API allows SQL queries to operate with data of various formats contained in a database.

A query plan, such as the depicted query plan 214, may include a set of instructions that indicate what operations are to be performed in order to process a query. A query plan may have a tree-like structure consisting of various nodes, where each node represents one or more of these operations. The operations can include, but are not limited to, operations such as reading data from a table, writing data to a table, executing a user-defined function, joining data, and sorting data.

An executor, such as any of the depicted executors 216a-n, may include one of the computing nodes that make up the distributed database system 200. Executors assist in the processing of a query by each performing one or more stages of an execution plan. The stages can comprise operations such as accessing a table, joining data from different tables, sorting data, executing user-defined functions, and so on.

Figure 3:
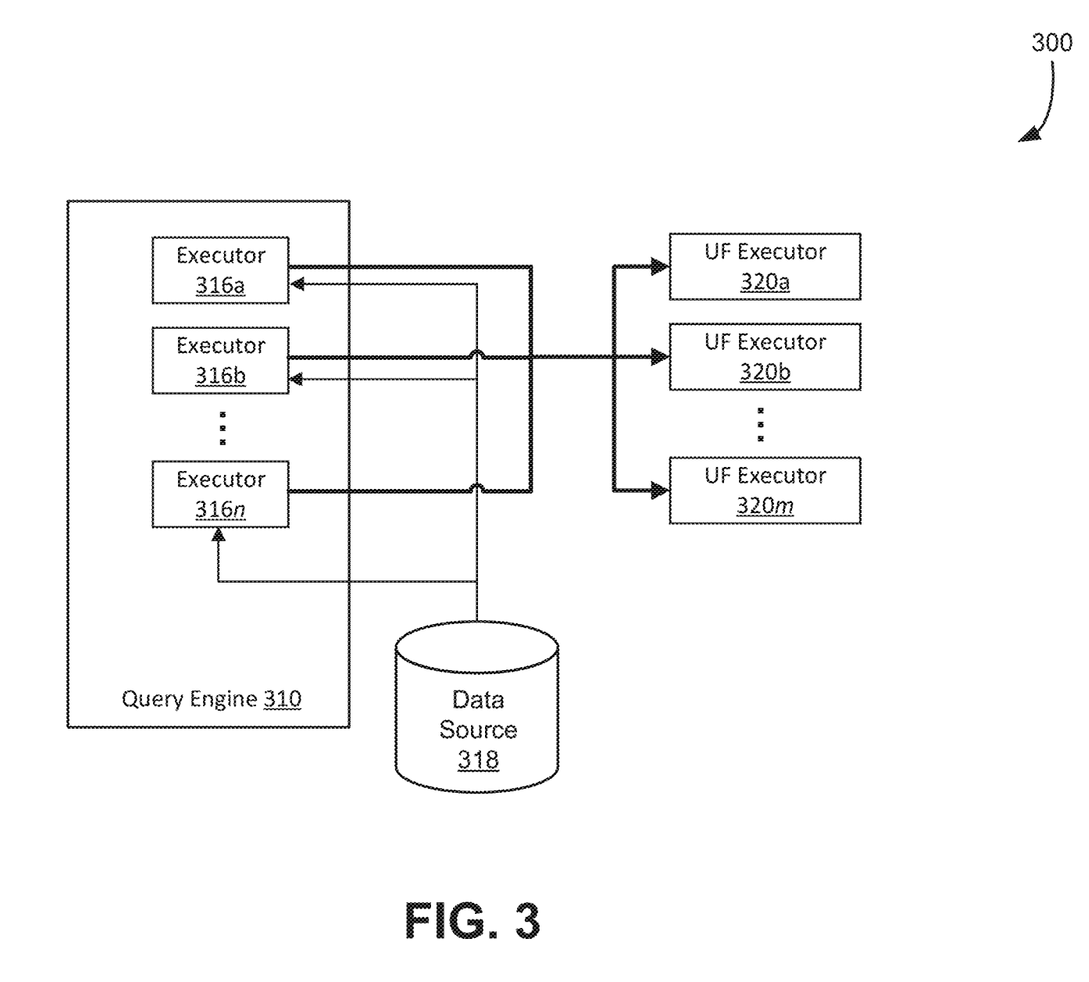
FIG. 3 illustrates an example of aspects of a distributed database system executing functions via sandboxed executors, in accordance with at least one embodiment.

A user function executor, such as the depicted user function executor 218, is a separate security environment in which proxy code contained in a function is executed, and is described further herein at least in conjunction with FIG. 3. By being in a separate security environment from a query engine, a user function executor, a query engine, a query engine frontend, or any portion of a distributed database, is considered to be sandboxed. In an embodiment, a user function executor may be dedicated to a specific executor. In an embodiment, a user function executor may be chosen by an executor.

The distributed database system 200 may include capabilities for executing user-defined functions. User-defined functions, which might also be referred to as user functions, user code, and so on, can include processor-executable code, intermediate code, interpretable code, and so forth. Examples of user-defined functions include routines that accept one or more parameters, and return one or more values as output. User-defined functions provide significant and useful flexibility, but may be associated with a degree of risk, particularly in multiuser environments. For example, a user-defined function might contain "trojan horse" code that is intended to obtain access to which the user is not entitled.

The distributed database system 200 may also include support for secured access to certain types of tables or other data sources, such as tables or other data sources which include data owned by multiple users, where each user may have a different set of permissions. For example, a given user might be permitted to access the data owned by that user, but not permitted to access data owned by any other user.

In order to operate at high speed, embodiments of the distributed database system 200 might execute a user-defined function within an executor, and implement access control within the query engine 210. However, this approach presents a security problem. User-submitted code, when executed, may potentially have the ability to inspect and/or alter the contents or behavior of the application it's running in or the system it's running on, including one or more of a process, virtual machine, or computing device. This may be the case whether or not such usage is intended. Furthermore, the user-defined function may leave behind running code that can compromise the system even after the user-defined function executes.

A distributed database system may, in some embodiments, execute a query according to the following steps. First, the user may submit the query by providing SQL text or invoking one or more application programming interfaces ("APIs"). The query is then transformed into a query plan. The query plan may take the form of a tree data structure, where the leaf nodes of the tree may typically represent operations that read data from a data source. The ancestors of these nodes may describe various operations that might be performed on this data, such as sorting, filtering, joining, and so forth. The resulting query plan may then be transformed into an executable plan, made up of a set of stages. The stages may have dependencies, such as one stage requiring input that is to be provided by the execution of another stage.

The coordinator 206 then orchestrates execution of these stages by sending them to the executors 216*a-n*. The executors may then execute the respective stages.

However, embodiments taking this approach might encounter certain problems. For example, a single stage might have code that both reads data from a secured source and applies security filters to it, and that executes a user-defined function. This may present a security risk, since the user-defined function might execute code that could interfere with the operation of the security filters, or otherwise obtain data that the user-defined function is not entitled to access.

To address these issues, embodiments may include a query engine frontend, such as query engine frontend 102 discussed in conjunction with FIG. 1, where a user program submits a query by invoking one or more proxy APIs that are separate from the query engine itself. Once the function required to execute the query are identified, its code is sent to the query engine where it is wrapped into an enveloped function. A query plan is created, and the enveloped function is executed by an executor that sends the function's code to be executed in a sandboxed environment. In this way, a user program does not interact with the query engine, thus reducing the security risk posed by the user program.

FIG. 3 illustrates an example of aspects of a distributed database system 300 executing functions on sandboxed executors, in accordance with at least one embodiment. In an embodiment, query engine 310 and executors 316*a-n* are query engine 210 and executors 216*a-n* as described in conjunction with FIG. 2. As described in relation to the preceding figures, the distributed database may execute proxy functions on a sandboxed executor, such as any one of user function executors 320*a-m*. A number of executors may be different from a number of user function executors. In an embodiment, a user function executor is referred to as a sidecar. User function executors 320*a-m* may be chosen by any of executors 316*a-n* to execute proxy code. In an embodiment, when an executor can choose from multiple user function executors, many-to-many mapping exists, and the user function executors are collectively referred to as a user function executor farm ("UFE farm"). An executor may choose a user function executor based on a fixed mapping; sharding based on hashing some part of the user-defined function, such as its name; or techniques that take into account operational metrics, such as which user function executor has a lesser load or whether the user-defined function is expected to take a certain amount of resources.

A data source, such as the depicted data source 318, can include any computing device or service that maintains tables or partitions of a table. In some cases, the executors themselves may store such data, such as when the executors maintain horizontal or vertical partitions of a table. Executors receive inputs from a data source to run an enveloped function.

Figure 4:
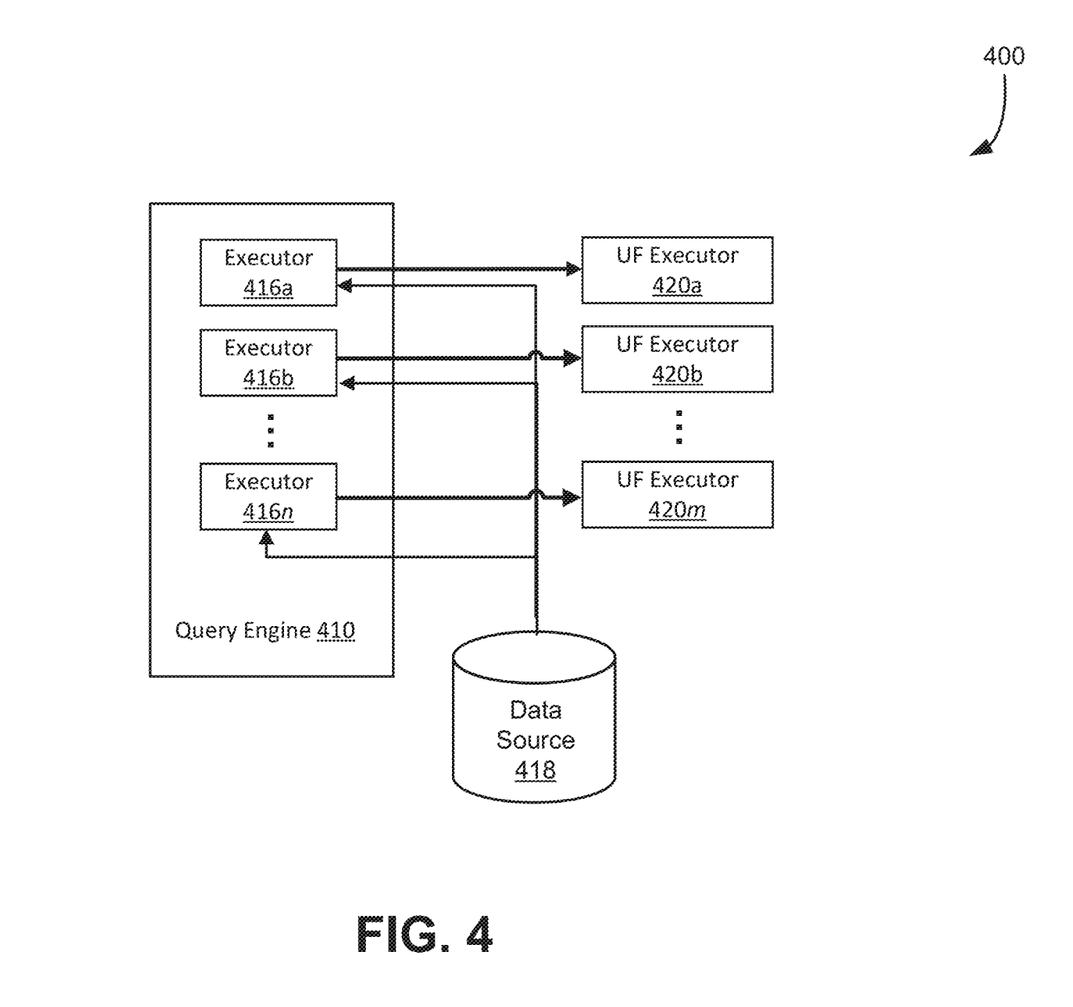
FIG. 4 illustrates an example of aspects of a distributed database system executing functions via executors, in accordance with at least one embodiment.

FIG. 4 illustrates an example of aspects of a distributed database system 400 executing functions on sandboxed executors, in accordance with at least one embodiment. In an embodiment, query engine 410, executors 416*a-n*, and data source 418, are query engine 310, executors 316*a-n*, and data source 318 as described in conjunction with FIG. 3. As depicted in FIG. 4, each of executor of executors 416*a-n* are assigned to a specific user function executors of user function executors 420*a-m*. While each executor may be assigned a user function specific executor, a number of executors may be different from a number of user function executors. When a user function executor is assigned to a specific executor, that is referred to as one-to-one mapping. User function executors run on containers, virtual machines, or hardware separate from a query engine and take no part in actual data reading or query processing. In an embodiment, however, a user function executor may be a container or a virtual machine located on the same hardware as an executor.

Figure 5:
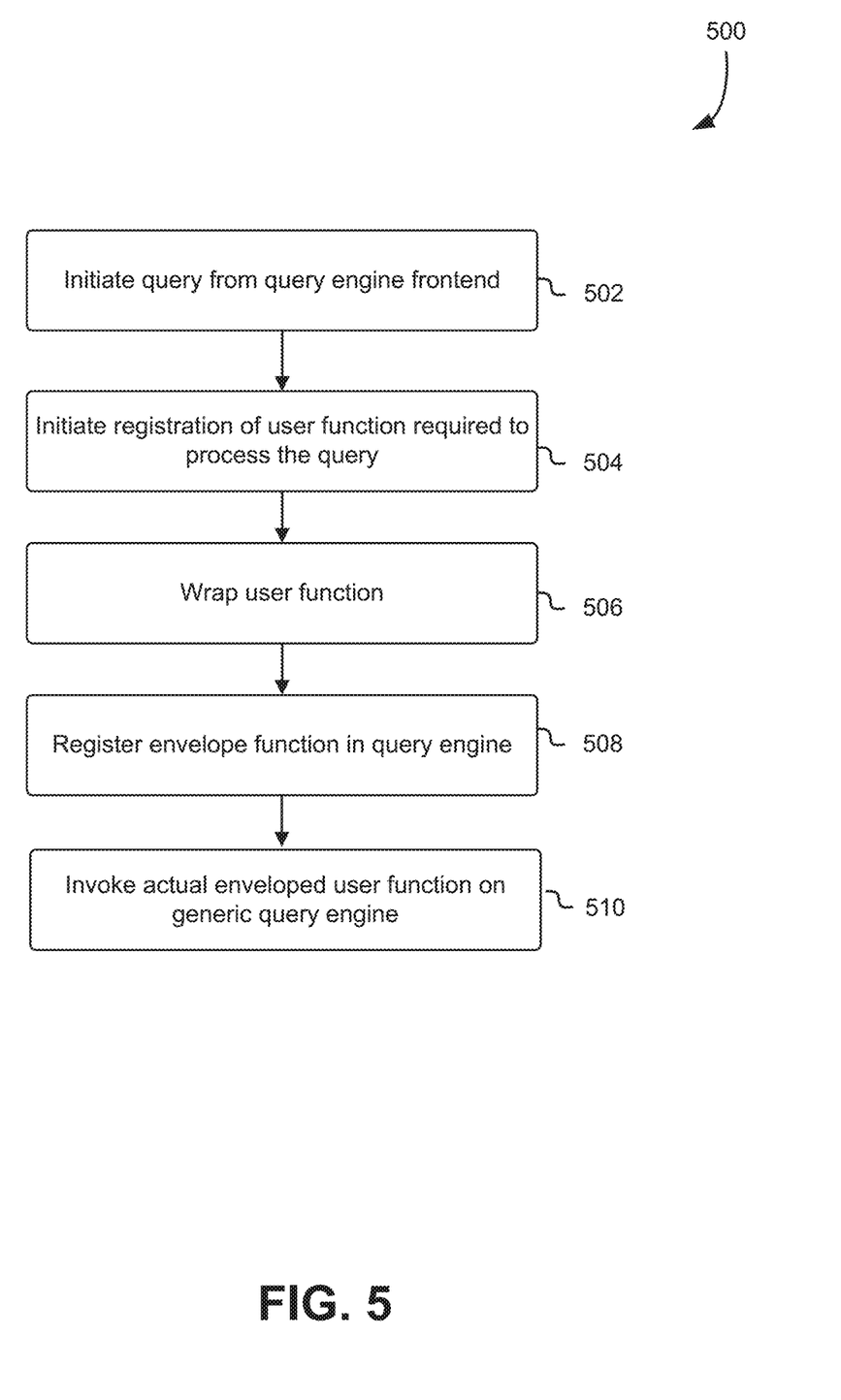
FIG. 5 illustrates an example process of a distributed database system registering a function, in accordance with at least one embodiment.

FIG. 5 illustrates an example process 500 of a distributed database system registering a user function in accordance with at least one embodiment. Although the example process 500 of FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 502, a query is initiated from the query engine frontend. The query causes a user program running on the query engine frontend to access a query engine proxy API to determine a user function to invoke in order to process the query. The query engine proxy API may be a copy of a query engine proxy API located in a query engine. By running a user program on a query engine frontend, instead of a coordinator, and forcing that user program to interact with a query engine proxy API on that frontend, the user program is separated from the query engine, reducing any risk the user program may pose to the query engine.

At 504, a user program on the query engine front end initiates registration of a user function. In an embodiment, a user program invokes a proxy API corresponding with an API located on a query engine. As an example, the user program registers the proxy API as $F_1$. The query engine frontend proxy API serializes $F_1$'s signature ($F_1$.ParamTypes, $F_1$.ResultType) and its code ($F_1$.code) into bits and sends it to a proxy service endpoint on a query engine.

At 506, a proxy service endpoint uses a function wrapper module to generate an envelope function $EF_1$ for $F_1$. $EF_1$ incudes proxy code (Proxy(<code>)), which is an executable function that runs <code> in a sandboxed environment, or a separate security domain. <code> is identical with the code of $F_1$, which is located in a query engine API, except <code> is retrieved from a query engine proxy API located on the query engine frontend.

At 508, a proxy service endpoint registers the envelope function $EF_1$ with a query engine, using the alias $F_1$. If $F_1$ is referenced by the user program, the query engine invokes $EF_1$ instead of $F_1$. If a user program invokes a query engine proxy API that requires an anonymous user function, the process of registering a function is the same as that discussed above, except the user function is given an arbitrarily generated name.

At 510, the proxy service endpoint then invokes an API on the query engine API equivalent to the function identified on the query engine frontend. The query engine API may be located as part of the coordinator of the query engine. Performing operations 602 and 604 allow a user program to initiate a query as if it were located on the query engine and accessing its query engine API.

Figure 6:
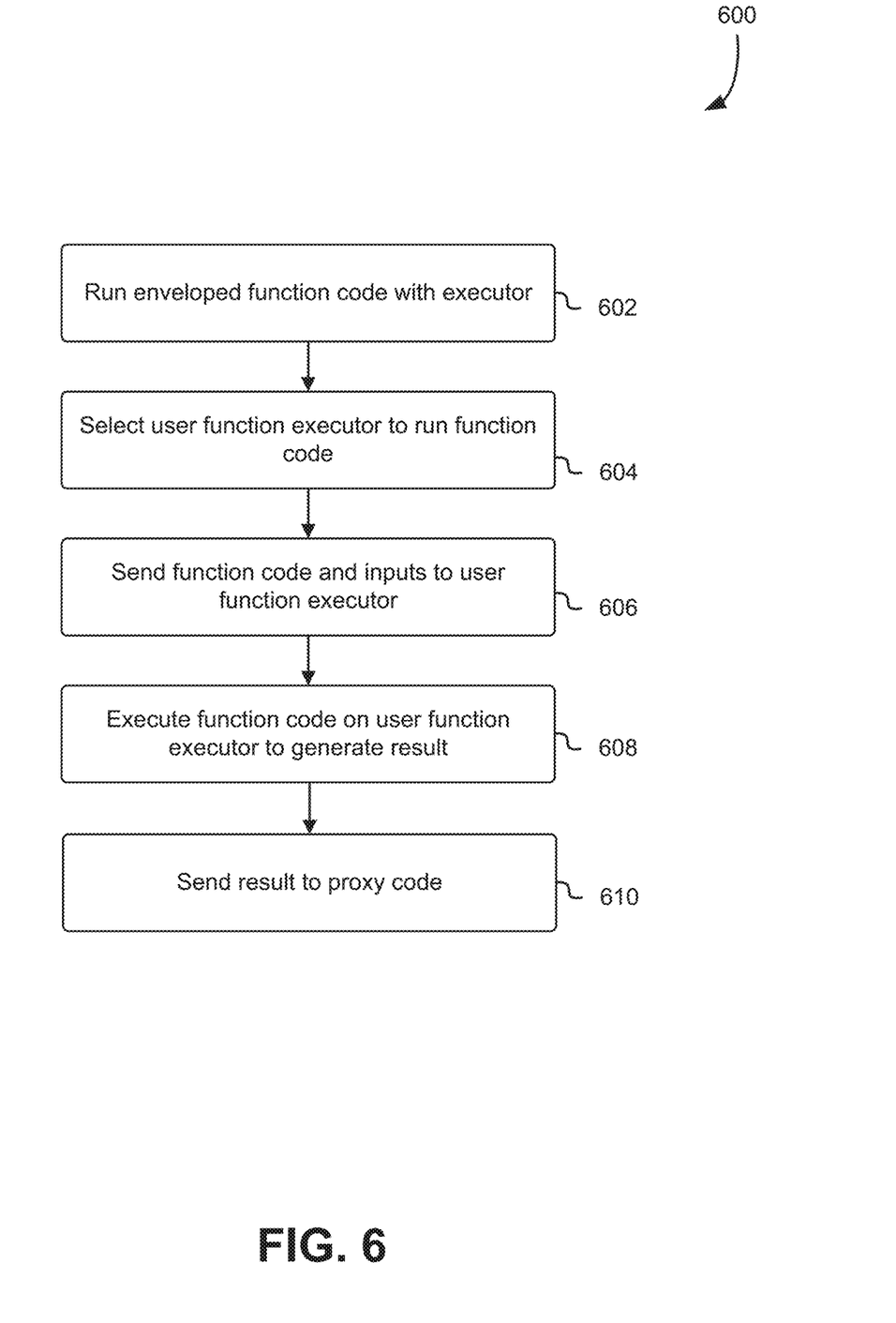
FIG. 6 illustrates an example process of a distributed database system processing an enveloped function, in accordance with at least one embodiment.

FIG. 6 illustrates an example process 600 of a distributed database executing an enveloped function, in accordance with at least one embodiment. Although the example process 600 of FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel. The input may be one or more values.

At 602, an executor on a query engine runs an enveloped function. An executor runs an enveloped function after a query plan inlines, or references, the enveloped function. An executor invokes the enveloped function (EF.Code) using inputs from a data source. EF.Code is proxy code (Proxy (F.code)), which is a proxy function. F is a user function. In an embodiment, invoking the enveloped function may be vectorized.

At 604, the proxy code selects a user function executor on which to run user function code (F.code). Proxy(F.Code) may choose a user function executor based on a fixed mapping, sharding, or operational metric as discussed further above at least in conjunction with FIG. 5.

At 606, once a user function executor has been selected, the proxy code opens a connection to a selected user function executor. In the event that the user function executor already contains user function code, the proxy code does not open a connection to that user function executor. The proxy code also sends inputs to the user function executor.

At 608, the user function executor executes the user function code on the inputs and generates a result. If the inputs are a collection of items, the user function code is run on each item, and returns a collection of result items, with one result item per input item.

At 610, the user function executor sends the result to the proxy code. Then the proxy code returns the result to a calling code within the enveloped function.

Figure 7:
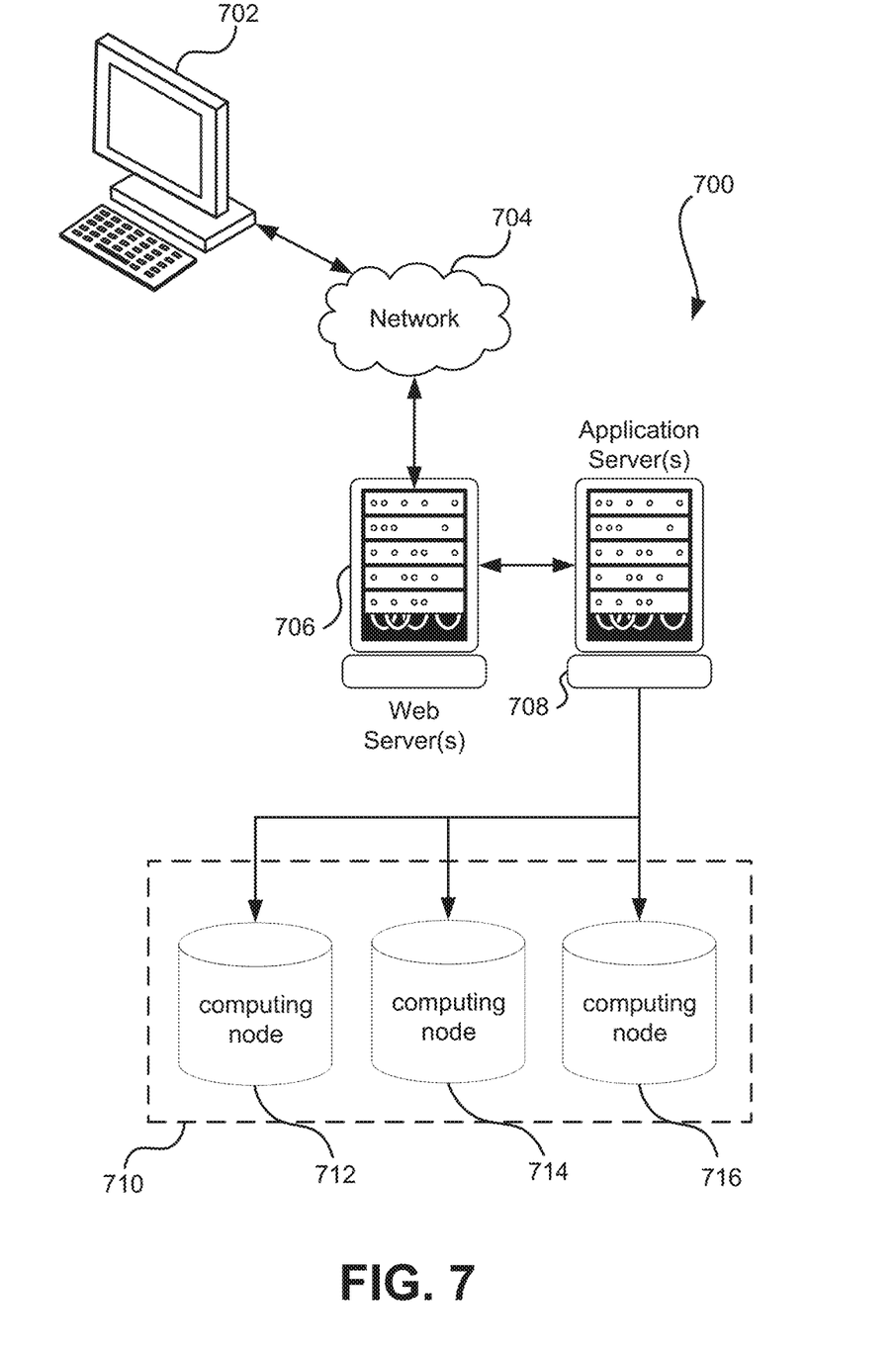
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a distributed database 710, and it should be understood that there can be several application servers, layers or other elements, processes or components, which may be chained or otherwise configured, which can interact to perform tasks such as obtaining data from an appropriate data store. The distributed database 710, in at least one embodiment, corresponds to a distributed database described herein in relation to the preceding figures. The distributed database 710 can comprise a plurality of computing nodes 712, 714, and 716. The computing nodes 712, 714, and 716 may, for example, correspond to executors and a query engine as described in relation to FIG. 1, and others of the preceding figures.

Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The distributed database 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data and user information, which are used to serve content for the production side. The data store also is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the distributed database 710.

The distributed database 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A, B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory that stores computer-executable instructions that, in response to execution by the at least one processor, cause the system to:
   receive a query via a proxy query engine;
   determine, based on the query, that the query indicates a call to a user-defined function;
   wrap the user-defined function to generate an enveloped function to be processed by a query engine;
   determine a query plan comprising execution of the enveloped function;
   transfer at least a portion of the envelope function to an environment sandboxed from the proxy query engine and the query engine; and
   cause the at least a portion of the enveloped function to be executed in the environment sandboxed from the proxy query engine and the query engine.

2. The system of claim 1, the at least one memory comprising further computer-executable instructions that, in response to execution by the at least one processor, cause the system to:
   receive serialized code of the user-defined function and generate the enveloped function using an alias.

3. The system of claim 1, wherein a user program runs within the proxy query engine.

4. The system of claim 1, the at least one memory comprising further computer-executable instructions that, in response to execution by the at least one processor, cause the system to:
   cause a proxy service endpoint of the query engine to process the user-defined function sent by the proxy query engine.

5. The system of claim 1, the at least one memory comprising further computer-executable instructions that, in response to execution by the at least one processor, cause the system to:
   choose a user function executor on which to execute the enveloped function.

6. A computer-implemented method of processing a query of a database, comprising:
   receiving a query via a first proxy query engine;
   determining that the query indicates a call to a user-defined function;
   generating, via a second query engine, an enveloped function based on the user-defined function;
   generating a query plan comprising a call to the envelop function;

transferring at least a portion of the enveloped function to an environment sandboxed from the first proxy query engine and second query engine; and causing the at least a portion of the enveloped function to be executed in the sandboxed security environment.

7. The computer-implemented method of claim 6, wherein the method further comprises:

receiving serialized code of the user-defined function and generating the enveloped function.

8. The computer-implemented method of claim 6, wherein the query plan causes executors that are part of the second query engine to invoke the proxy function.

9. The computer-implemented method of claim 6, wherein:

the first proxy query engine is based at least in part on the second query engine.

10. The computer-implemented method of claim 6, wherein:

the sandboxed environment is dedicated to an executor that is part of the second query engine.

11. The computer-implemented method of claim 6, wherein:

the second query engine comprises an executor that executes the enveloped function.

12. The computer-implemented method of claim 6, wherein a proxy application programming interface (API) of the first proxy query engine is identical to a query engine API on the second query engine.

13. The computer-implemented method of claim 6, wherein the enveloped function comprises a proxy function based at least in part on code contained in the user-defined function.

14. A non-transitory computer-readable storage medium storing thereon executable instructions that, as a result of being executed by one or more processors of a computer system, cause the computer system to at least:

receive a query via a first proxy query engine;

determine that the query indicates a call to a user-defined function;

generate, via a second query engine, an enveloped function based on the user-defined function;

generate a query plan comprising a call to the proxy enveloped function;

transfer at least a portion of the enveloped function to an environment sandboxed from the first proxy query engine and second query engine; and cause the at least a portion of the enveloped function to be executed in the sandboxed security environment.

15. The non-transitory computer-readable storage medium of claim 14, comprising further instructions that, as a result of being executed by the one or more processors, cause the computer system to:

receive serialized code of the user-defined function and generate the enveloped function.

16. The non-transitory computer-readable storage medium of claim 14, wherein the query plan causes executors to choose the sandboxed environment in which to execute the proxy function.

17. The non-transitory computer-readable storage medium of claim 14, wherein:

the first proxy query engine is based, at least in part, on the second query engine.

18. The non-transitory computer-readable storage medium of claim 14, wherein:

the sandboxed environment is dedicated to an executor that is part of the second query engine.

19. The non-transitory computer-readable storage medium of claim 14, wherein:

the second query engine comprises an executor that executes the enveloped function.

20. The non-transitory computer-readable storage medium of claim 14, wherein the first proxy query engine comprises a query engine proxy application programming interface (API) based at least in part on a second query engine API.

* * * * *